United States Patent
Lee et al.

(10) Patent No.: US 10,655,581 B2
(45) Date of Patent: May 19, 2020

(54) FUEL SUPPLY SYSTEM FOR LPG VEHICLE

(71) Applicants: Hyundai Motor Company, Seoul (KR); Kia Motors Corporation, Seoul (KR)

(72) Inventors: Jae Min Lee, Chungcheongnam-do (KR); Jong Ki Kim, Gyeonggi-do (KR); Chang Han Kim, Gwangju (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 26 days.

(21) Appl. No.: 16/172,541

(22) Filed: Oct. 26, 2018

(65) Prior Publication Data
US 2020/0025163 A1 Jan. 23, 2020

(30) Foreign Application Priority Data

Jul. 17, 2018 (KR) .................. 10-2018-0082665

(51) Int. Cl.
| | |
|---|---|
| F02M 1/00 | (2006.01) |
| F02M 37/00 | (2006.01) |
| F02M 21/02 | (2006.01) |
| F02M 37/10 | (2006.01) |
| F02M 59/46 | (2006.01) |
| F16K 11/10 | (2006.01) |
| F17C 5/02 | (2006.01) |
| F17C 13/04 | (2006.01) |

(52) U.S. Cl.
CPC .... *F02M 37/0058* (2013.01); *F02M 21/0212* (2013.01); *F02M 21/0245* (2013.01); *F02M 37/10* (2013.01); *F02M 59/46* (2013.01); *F16K 11/105* (2013.01); *F17C 5/02* (2013.01); *F17C 13/04* (2013.01)

(58) Field of Classification Search
CPC ......... F02D 41/3845; F02D 2200/0602; F02D 41/20; F02D 41/40; F02M 63/0265
USPC ................ 123/445, 446, 456, 495, 499, 510
See application file for complete search history.

(56) References Cited

U.S. PATENT DOCUMENTS

| | | | | |
|---|---|---|---|---|
| 6,115,542 A | * | 9/2000 | Nir ........................... | F23K 5/20 165/108 |
| 2004/0035183 A1 | * | 2/2004 | O'Brien ............... | G01N 1/2202 73/23.27 |

(Continued)

FOREIGN PATENT DOCUMENTS

| | | |
|---|---|---|
| JP | 2008-256214 A | 10/2008 |
| KR | 2004-0083301 A | 10/2004 |

(Continued)

*Primary Examiner* — John Kwon
(74) *Attorney, Agent, or Firm* — Mintz Levin Cohn Ferris Glovsky and Popeo, P.C.; Peter F. Corless

(57) ABSTRACT

A returnless fuel supply system applicable to an LPG vehicle is provided. The system supplies LPG fuel from an LPG bombe to an engine at a predetermined pressure or greater and prevents the generation of vapor in the LPG fuel, thereby eliminating a need to return a portion of the LPG fuel supplied to the engine to the LPG bombe. Through the application of the returnless fuel supply system that does not return the high temperature fuel to the LPG bombe, the cause of the internal pressure increase in the LPG bombe is eliminated, and thus efficient refueling of LPG bombe with LPG fuel is achieved.

9 Claims, 6 Drawing Sheets

(56) References Cited

U.S. PATENT DOCUMENTS

| | | | | |
|---|---|---|---|---|
| 2005/0130002 A1* | 6/2005 | Kuriiwa | ............ | H01M 8/04029 |
| | | | | 429/437 |
| 2010/0065358 A1* | 3/2010 | Harris | ...................... | B60K 6/48 |
| | | | | 180/65.265 |
| 2011/0180160 A1* | 7/2011 | Froehlich | ................ | F15B 1/022 |
| | | | | 137/455 |
| 2012/0251341 A1* | 10/2012 | Powell | .................. | F04B 23/021 |
| | | | | 417/63 |

FOREIGN PATENT DOCUMENTS

| KR | 2013-0013752 A | 2/2013 |
|---|---|---|
| KR | 2013-0065026 A | 6/2013 |

\* cited by examiner

---: LPG FUEL FLOW DIRECTION

----: LPG FUEL FLOW DIRECTION

----→ : LPG FUEL FLOW DIRECTION

FUEL SUPPLY SYSTEM FOR LPG VEHICLE

CROSS-REFERENCE TO RELATED APPLICATION

This application claims under 35 U.S.C. § 119(a) the benefit of priority to Korean Patent Application No. 10-2018-0082665 filed on Jul. 17, 2018, the entire contents of which are incorporated herein by reference.

BACKGROUND

(a) Technical Field

The present disclosure relates to a fuel supply system for a liquefied-petroleum-gas (LPG) vehicle, and more particularly, to a fuel supply system for an LPG vehicle, which adopts a returnless fuel supply system that does not return a portion of LPG fuel supplied to an engine to an LPG bombe to always enable efficient refueling of the LPG bombe with LPG fuel.

(b) Background Art

Generally, an LPG fuel vehicle uses a fuel supply system that returns a portion of LPG fuel supplied to an engine to an LPG bombe. In other words, it is difficult to accurately control the actual amount of fuel supplied to the engine due to a phenomenon (e.g., a vapor lock phenomenon) in which a portion of the LPG fuel supplied to the engine is vaporized by a high temperature. Accordingly, the LPG fuel vehicle adopts a system that supplies a sufficient amount of LPG fuel, which is greater than the amount of fuel required for combustion, to the engine, and returns the remaining unburned fuel to the LPG bombe.

A charging process of such an LPG fuel vehicle, as illustrated in FIG. 1 of the related art, includes driving a charging pump 2 of a charging station, delivering LPG fuel from an LPG reservoir 1 of the charging station to a charging gun 3 by the driving of the charging pump 2, and charging an LPG bombe of a vehicle with the LPG fuel by the LPG charging pressure of the charging gun 3.

However, refueling of the LPG fuel may be impossible when the internal temperature and pressure of the LPG bombe increase due to the unburned fuel (e.g., when the temperature thereof is increased by the high-temperature engine) returned to the LPG bombe after being supplied to the engine. In other words, when the internal temperature and pressure of the LPG bombe increase above the temperature and pressure required to charge the LPG bombe with the LPG fuel due to the high-temperature LPG fuel returned from the engine, refueling of the LPG fuel from the charging gun to the LPG bombe may become impossible. Further, since the pressure in the LPG bombe becomes greater than the LPG charging pressure under the condition in which an external temperature increases rapidly during hot weather, charging of the LPG fuel becomes even more difficult.

SUMMARY

The present disclosure provides a returnless fuel supply system applicable to an LPG vehicle, which may supply LPG fuel from an LPG bombe to an engine at a predetermined pressure or greater and may prevent the generation of vapor in the LPG fuel, thereby eliminating a need to return a portion of the LPG fuel supplied to the engine to the LPG bombe.

In one aspect, a fuel supply system for an LPG vehicle may include a first fuel supply line connected to an engine and to a fuel pump mounted in an LPG bombe, a 3-way solenoid valve mounted on a rear end portion of the first fuel supply line, a regulator mounted on a front end portion of the first fuel supply line and including a solenoid valve to allow or block a flow of LPG fuel toward the engine and a pressure sensor configured to measure a pressure in a fuel line through which the LPG fuel flows, a second fuel supply line branched from the 3-way solenoid valve and connected to the first fuel supply line near a regulator inlet, an auxiliary pump assembly mounted on the second fuel supply line to pressurize the fuel flowing through the second fuel supply line to a reference pressure or greater and remove vapor contained in the fuel, and a controller configured to operate the 3-way solenoid valve and the auxiliary pump assembly.

In an exemplary embodiment, the auxiliary pump assembly may include an auxiliary chamber having a predetermined volume, a vapor removal filter mounted on an inlet side of the auxiliary chamber to primarily break the vapor contained in the LPG fuel, and an auxiliary pump fixedly mounted inside the auxiliary chamber via a bracket to pressurize the LPG fuel to the reference pressure or greater. The vapor removal filter may include a filter frame, and a plurality of types of multilayered nonwoven fabric having different lattice structures to primarily break the vapor in the LPG fuel and attached to the filter frame.

In addition, the auxiliary pump may include a motor mounted in a case, an impeller configured to pressurize and pump the fuel by driving of the motor, and a cover mounted on a rear portion of the case to cover the impeller. The cover may be formed with a vapor discharge aperture to discharge the vapor contained in the LPG fuel to a rear space in the auxiliary chamber when the impeller rotates to pump the fuel by driving of the motor.

The fuel supply system may further include a first check valve mounted on the first fuel supply line between the regulator and the 3-way solenoid valve. The fuel supply system may also include a second check valve mounted on the second fuel supply line between the regulator and the auxiliary pump assembly. The controller may be configured to receive a sensing signal from the pressure sensor. When the pressure in the fuel line is the reference pressure or greater, the controller may be configured to turn off the 3-way solenoid valve to supply the LPG fuel in the LPG bombe to the engine through the first fuel supply line.

In addition, the controller may be configured to receive a sensing signal from the pressure sensor. When the pressure in the fuel line is less than the reference pressure the controller may be configured to turn on the 3-way solenoid valve to pressurize and supply the LPG fuel in the LPG bombe to the engine through the second fuel supply line and operate an auxiliary pump of the auxiliary pump assembly. The controller may also be configured to receive a sensing signal from an ambient temperature sensor after start-off, and when a sensed temperature is a predetermined temperature or greater, may be configured to operate an auxiliary pump of the auxiliary pump assembly for a predetermined period of time.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein.

Figure 1:
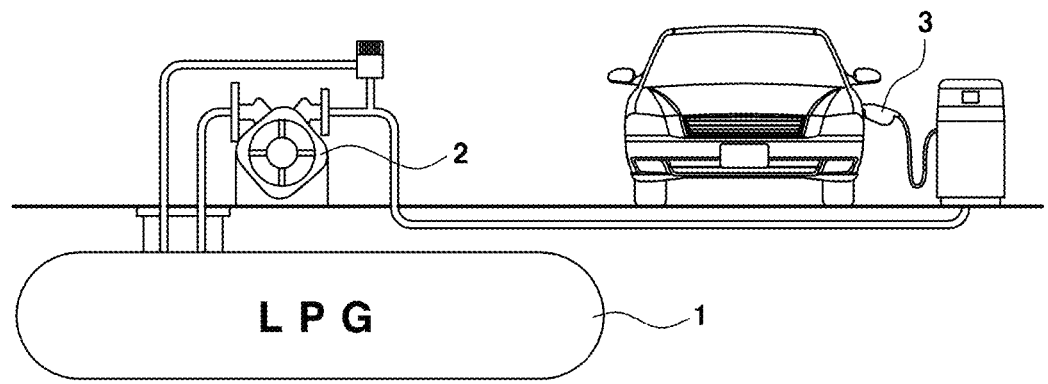
FIG. 1 is a schematic view illustrating a charging process of an LPG fuel vehicle according to the related art.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings to allow those skilled in the art to easily practice the exemplary embodiments.

Figure 2:
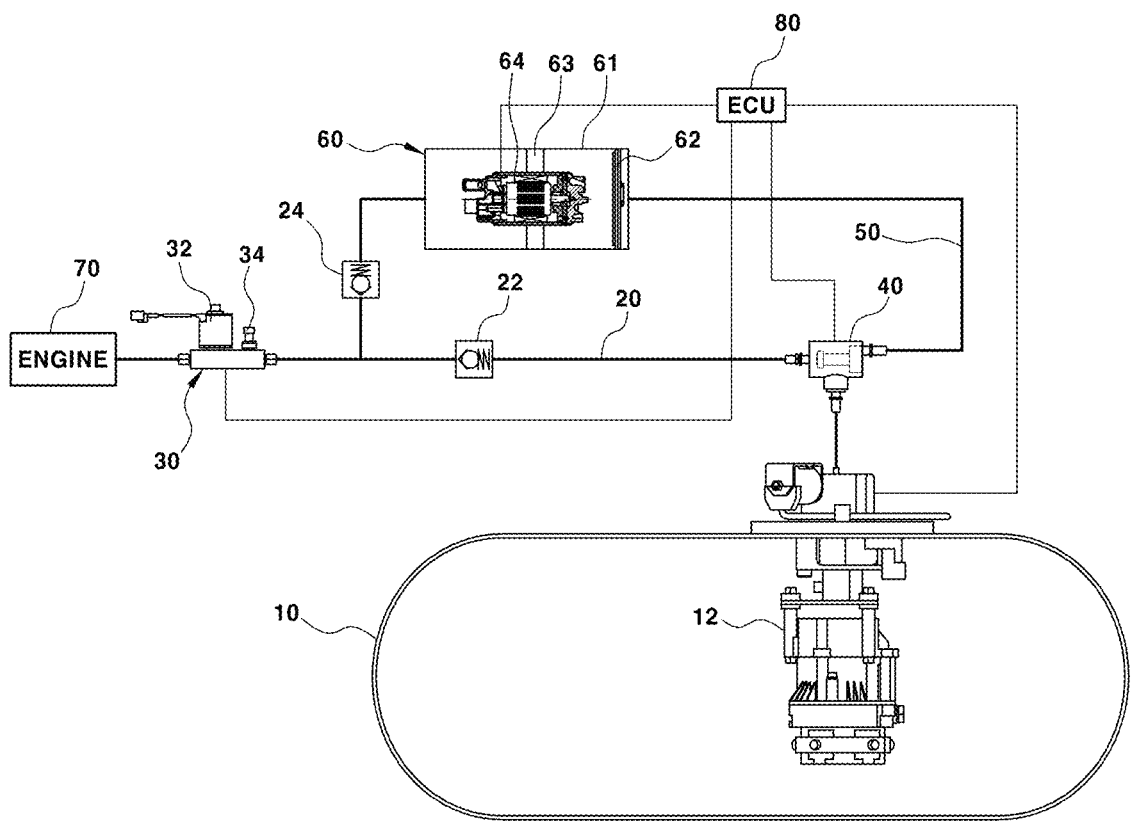
FIG. 2 is a view illustrating the configuration of a fuel supply system for an LPG vehicle according to an exemplary embodiment of the present disclosure.

FIG. 2 is a view illustrating the configuration of a fuel supply system for an LPG vehicle according to the present disclosure. Reference numeral 10 designates an LPG bombe. The LPG bombe 10 is a tank in which LPG fuel may be charged. The LPG bombe 10 may be connected to a charging line (not illustrated) to charge the LPG fuel, and a fuel pump 12 may be mounted in the LPG bombe 10 for pumping and supplying the LPG fuel to an engine 70.

A first fuel supply line 20 may be connected to a discharge portion of the fuel pump 12 mounted in the LPG bombe 10 and to the engine 70 to supply the fuel in the LPG bombe 10 to the engine 70 through the first fuel supply line 20 during driving of the fuel pump 12. In particular, a regulator 30 may be mounted at a front end position (i.e. a position proximate to the engine 70) of the first fuel supply line 20 to adjust the amount of the LPG fuel to supply a consistent amount of the LPG fuel to the engine 70. The regulator 30 may include a solenoid valve 32, which allows or blocks the flow of the LPG fuel toward the engine 70, and a pressure sensor 34 configured to measure the pressure in a fuel line through which the LPG fuel flows.

Particularly, a 3-way solenoid valve 40 may be mounted at a rear end position (i.e. a position proximate to the LPG bombe 10) of the first fuel supply line 20 to change the flow direction of the LPG fuel that has been discharged from the fuel pump 12 to the first fuel supply line 20. In addition, a first end of a second fuel supply line 50 may be connected to the 3-way solenoid valve 40, and a second end of the second fuel supply line 50 may be connected to the first fuel supply line 20 at the entrance side of the regulator 30.

Accordingly, when the fuel line pressure sensed by the pressure sensor 34 is equal to or greater than a reference pressure, which will be described below, the LPG fuel in the LPG bombe 10 may be supplied to the engine 70 through the first fuel supply line 20. When the fuel line pressure sensed by the pressure sensor 34 is less than the reference pressure, the LPG fuel in the LPG bombe 10 may be supplied to the engine 70 through the second fuel supply line 50 in which fuel pressurization and vapor removal are possible. Accordingly, an auxiliary pump assembly 60 may be mounted on the second fuel supply line 50 for pressurizing the LPG fuel to the reference pressure or greater and removing vapor contained in the LPG fuel.

The auxiliary pump assembly 60 may include an auxiliary chamber 61, which is a housing, having a predetermined volume and having an inlet and an outlet for fuel, and may be mounted on the second fuel supply line 50, a vapor removal filter 62 mounted in the inlet of the auxiliary chamber 61 to primarily break the vapor contained in the LPG fuel, and an auxiliary pump 64 fixedly mounted in the auxiliary chamber 61 via a bracket 63 to pressurize the LPG fuel to the reference pressure or greater.

Figure 3:
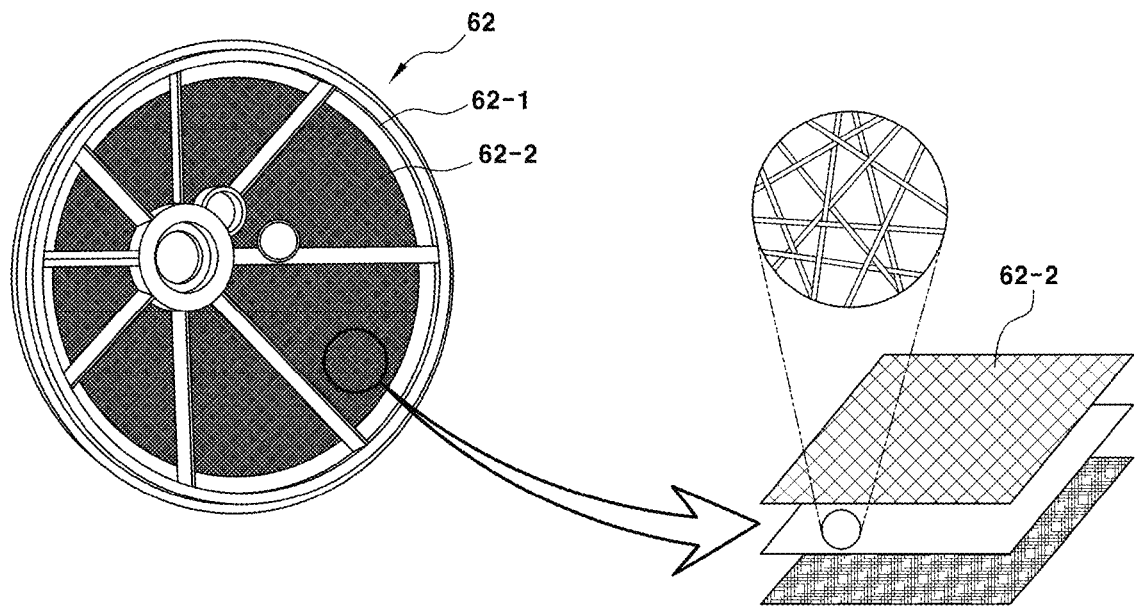
FIG. 3 is a view illustrating a vapor removal filter in the configuration of the fuel supply system for the LPG vehicle according to an exemplary embodiment of the present disclosure.

Referring to FIG. 3, the vapor removal filter 62 may include a filter frame 62-1, in which a circular rim and a radial bar are integrated with each other, and a piece of nonwoven fabric 62-2 attached to the filter frame 62-1 to primarily break (e.g., finely break) vapor in the LPG fuel. The piece of nonwoven fabric 62-2 may be formed by laminating a plurality of types of nonwoven fabric having different lattice structures. With this configuration, when the LPG fuel passes through the piece of nonwoven fabric 62-2, the vapor contained in the LPG fuel may be broken very finely.

Figure 4:
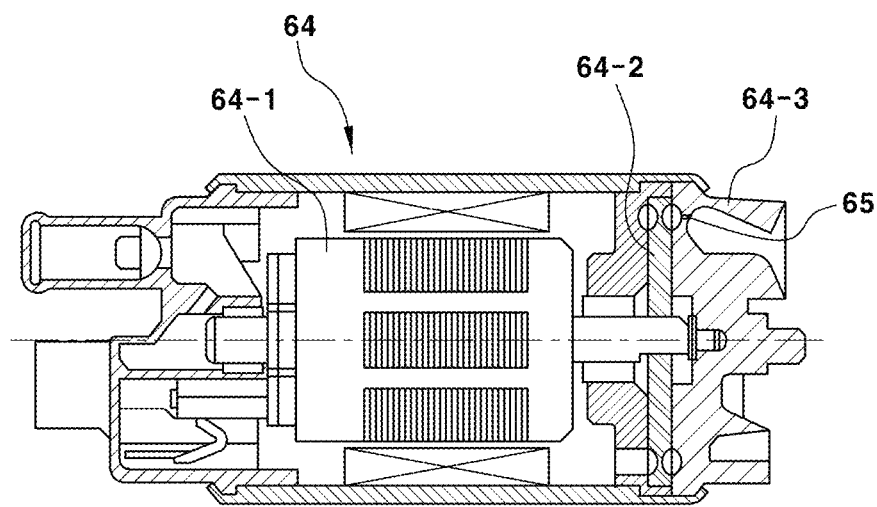
FIG. 4 is a cross-sectional view illustrating an auxiliary pump of an auxiliary pump assembly in the configuration of the fuel supply system for the LPG vehicle according to an exemplary embodiment of the present disclosure.
Figure 5:
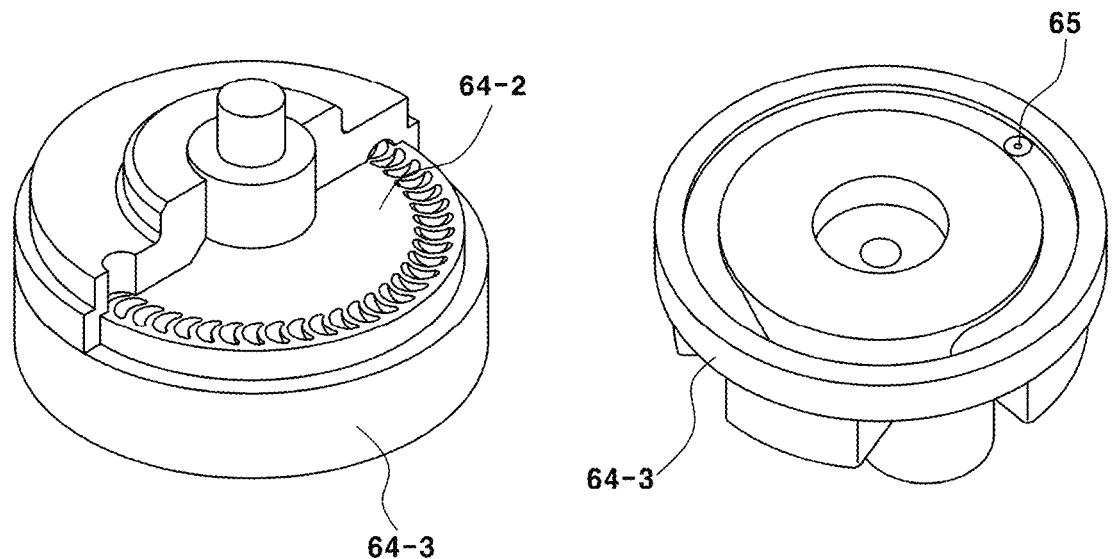
FIG. 5 is a schematic view illustrating the structure of an impeller and a cover having a vapor discharge aperture of the auxiliary pump illustrated in FIG. 4 according to an exemplary embodiment of the present disclosure.

Referring to FIGS. 4 and 5, the auxiliary pump 64 may include a motor 64-1 mounted within a case, an impeller 64-2 configured to pressurize and pump the LPG fuel by driving of the motor 64-1, and a cover 64-3, which covers the impeller 64-2 and is mounted on the rear portion of the case. Particularly, the cover 64-3 may be formed with an inlet, through which the LPG fuel enters the impeller 64-2, and also with a vapor discharge aperture 65, which discharges the vapor contained in the LPG fuel (e.g., the vapor that has been primarily finely broken by the piece of nonwoven fabric) into the inner space of the auxiliary chamber 61 for the removal of the vapor.

Accordingly, when the motor 64-1 of the auxiliary pump 64 is driven to rotate the impeller 64-2 and the fuel is pressurized and pumped toward the engine 70, the LPG fuel may be brought into contact with the rotating impeller 64-2 and thus, the vapor contained therein may be removed, and the removed vapor may be discharged to the rear space in the auxiliary chamber 61 through the vapor discharge aperture 65 in the cover 64-3.

A first check valve 22 may be mounted on the first fuel supply line 20 between the regulator 30 and the 3-way solenoid valve 40 to prevent backflow of the fuel from the engine 70, and a second check valve 24 may be mounted on the second fuel supply line 50 between the regulator 30 and the auxiliary pump assembly 60 to prevent backflow of the fuel from the engine 70. A controller 80 may be configured to receive, for example, a fuel line pressure sensing signal from the pressure sensor 34 and a sensing signal from an ambient temperature sensor (not illustrated) and may be configured to turn the 3-way solenoid valve 40 on or off and operate the auxiliary pump 64 of the auxiliary pump assembly 60 based on the sensing signals.

Figure 9:
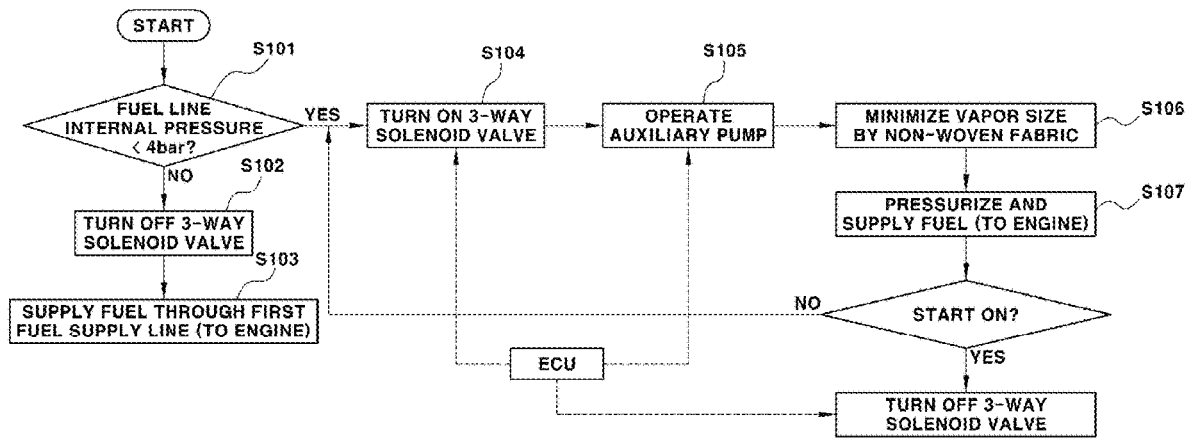
FIGS. 9 and 10 are flowcharts illustrating the operational flow of the fuel supply system for the LPG vehicle according to an exemplary embodiment of the present disclosure.
Figure 10:
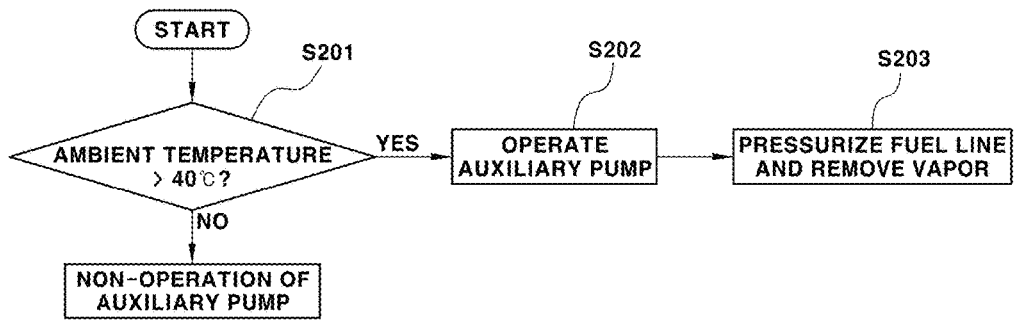

Hereinafter, the operational flow of the fuel supply system for an LPG vehicle according to the present disclosure having the above-described configuration will be described. FIGS. 9 and 10 are flowcharts illustrating the operational flow of the fuel supply system for the LPG vehicle according to the present disclosure.

First, the pressure sensor 34 may be configured to sense the pressure in the fuel line, through which the LPG fuel is supplied to the engine, and transmit a sensing signal to the controller 80. The controller 80 may be configured to determine whether the pressure sensed by the pressure sensor 34 is a reference pressure (e.g., about 4 bar) or greater or is less than the reference pressure (S101). When the pressure sensed by the pressure sensor 34 is the reference pressure (e.g., about 4 bar) or greater, since the LPG fuel may be supplied from the LPG bombe 10 to the engine 70 at the sensed pressure, the LPG fuel may be supplied to the engine 70 through the first fuel supply line 20, without being separately pressurized.

Figure 6:
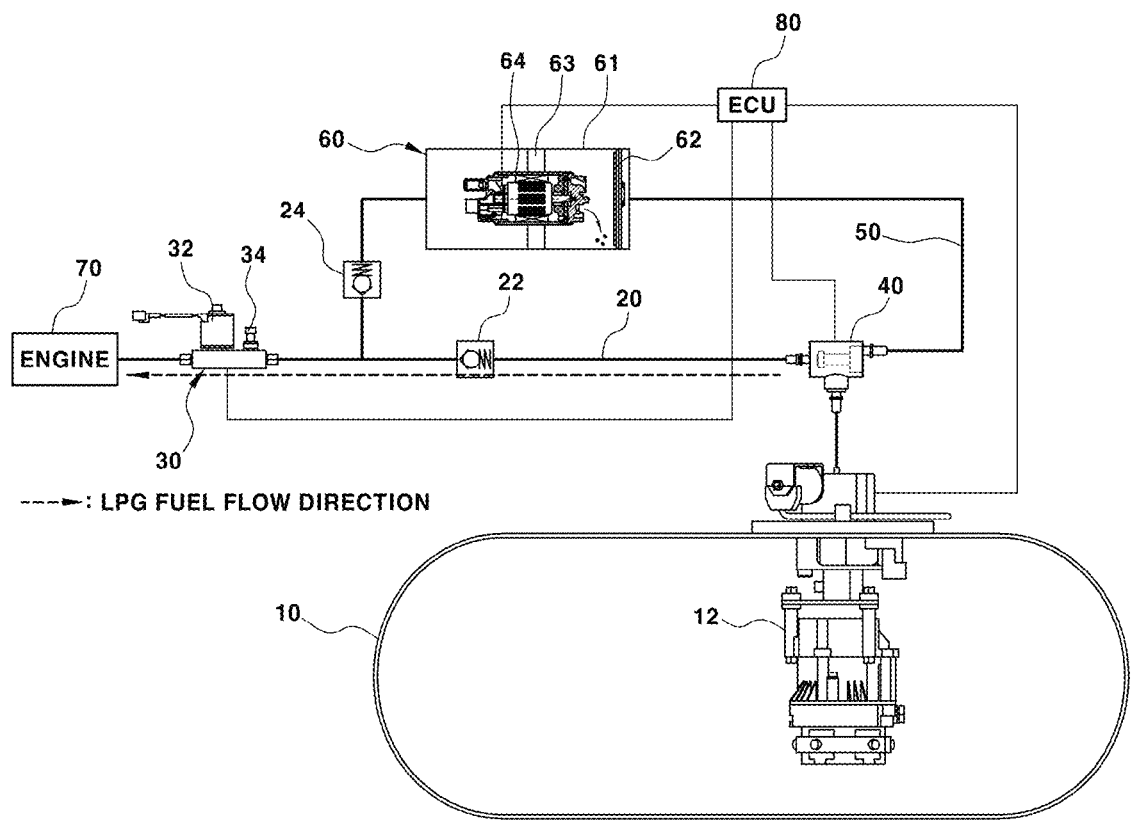
FIGS. 6 to 8 are views illustrating an example of the fuel supply operation of the fuel supply system for the LPG vehicle according to an exemplary embodiment of the present disclosure.

Accordingly, the controller 80 may be configured to maintain the 3-way solenoid valve 40 in the off state (S102). When the 3-way solenoid valve 40 is maintained in the off state, the LPG bombe 10 and the engine 70 are in communication with each other through the first fuel supply line 20. Thereby, as indicated by the arrow in FIG. 6, the LPG fuel discharged from the LPG bombe 10 may be supplied to the engine 70 (S103).

When the internal pressure of the LPG bombe is decreased due to external environmental conditions (e.g., a temperature drop, etc.), the pressure in the fuel line, through which the LPG fuel is supplied, may decrease below the reference pressure, and vapor may be present in the fuel line. Thus, when the pressure sensed by the pressure sensor 34 is less than the reference pressure (e.g., about 4 bar), since the LPG fuel may not be easily supplied from the LPG bombe 10 to the engine 70 at this pressure, the LPG fuel may be directed to the second fuel supply line 50 to be pressurized to the reference pressure or greater.

Figure 7:
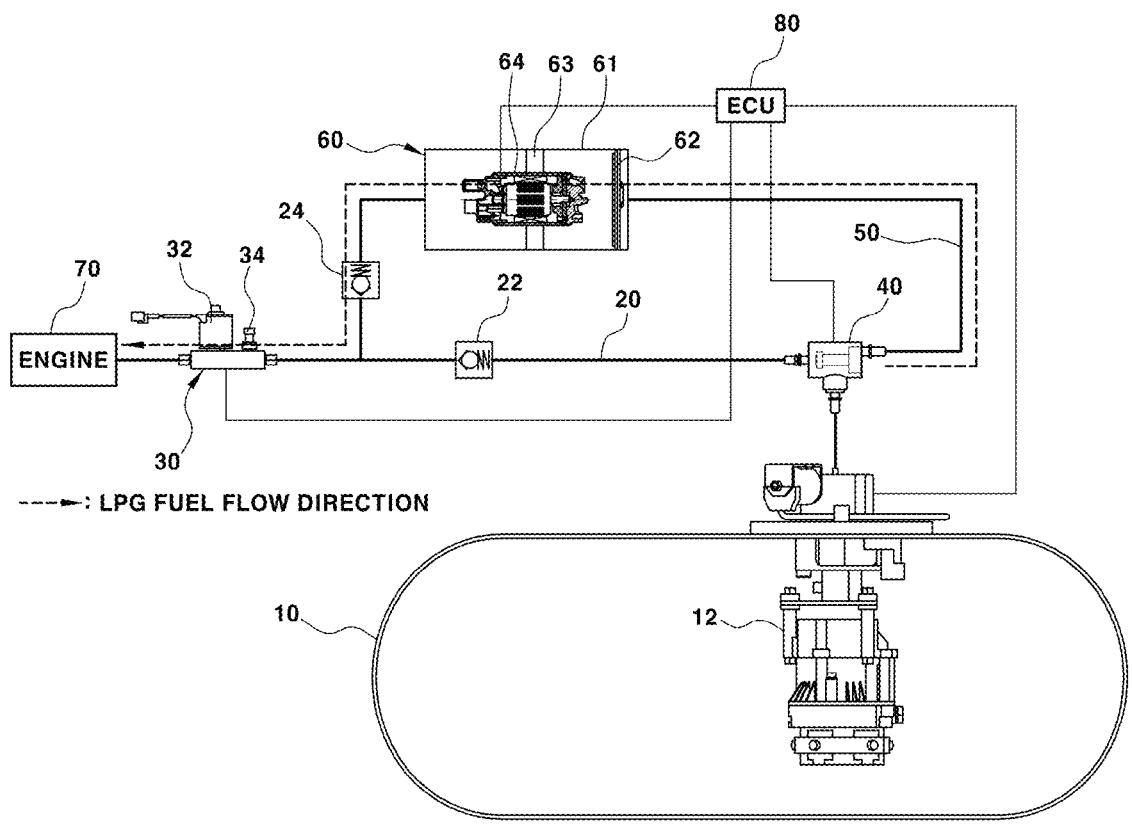

Accordingly, the controller 80 may be configured to turn on the 3-way solenoid valve 40 (S104). In addition, the controller 80 may be configured to drive the auxiliary pump 64 of the auxiliary pump assembly 60 (S105). As such, as indicated by the arrow in FIG. 7, the LPG fuel discharged from the LPG bombe 10 passes through the auxiliary pump assembly 60 along the second fuel supply line 20, and may then be supplied to the engine 70. The LPG fuel, which has been introduced into the auxiliary pump assembly 60, passes through the piece of nonwoven fabric 62-2 of the vapor removal filter 62. The vapor contained in the LPG fuel is primarily then finely broken by the piece of nonwoven fabric 62-2, thereby being minimized in size (S106).

Subsequently, the LPG fuel containing the vapor having the minimized size passes through the auxiliary pump 64. Since the motor 64-1 of the auxiliary pump 64 is driven to rotate the impeller 64-2 and the LPG fuel is pressurized and pumped toward the engine 70, the pressure in the fuel line, through which the LPG fuel is supplied, becomes the reference pressure or greater, whereby the LPG fuel may be supplied to the engine 70 more easily (S107).

At the same time, the LPG fuel may be brought into contact with the rotating impeller 64-2, which is rotated by the driving of the motor 64-1 of the auxiliary pump 64, to remove the vapor contained therein. The removed vapor may then be discharged to the rear space in the auxiliary chamber 61 through the vapor discharge aperture 65 in the cover 64-3. Accordingly, the LPG fuel containing no vapor may be supplied more easily to the engine 70. The vapor removal and fuel pressurization operation by the auxiliary pump assembly 60 may be temporarily continued until the pressure in the fuel line becomes the reference pressure or greater in the start-off state. When the vehicle is started in the state in which the pressure in the fuel line has reached the reference pressure or greater due to the vapor removal and fuel pressurization operation by the auxiliary pump assembly 60 (S108), the 3-way solenoid valve 40 may be turned off (S109), and thus, the LPG fuel discharged from the LPG bombe 10 may be supplied to the engine 70 through the first fuel supply engine 20 by driving of the fuel pump 12.

Meanwhile, there is a possibility that vaporization of the LPG fuel may occur due to an increase in temperature in the fuel line during hot weather (e.g., at a temperature of about 40° C. or greater), and thus, vapor may be generated in the fuel line. Accordingly, the controller 80 may be configured to receive a sensing signal from the ambient temperature sensor in the start-off state and determine whether the sensed temperature is a predetermined temperature or greater (S201). When the sensed temperature is the predetermined temperature or greater, the controller 80 may be configured to operate the auxiliary pump 64 of the auxiliary pump assembly 60 for a predetermined period of time (S202).

Figure 8:
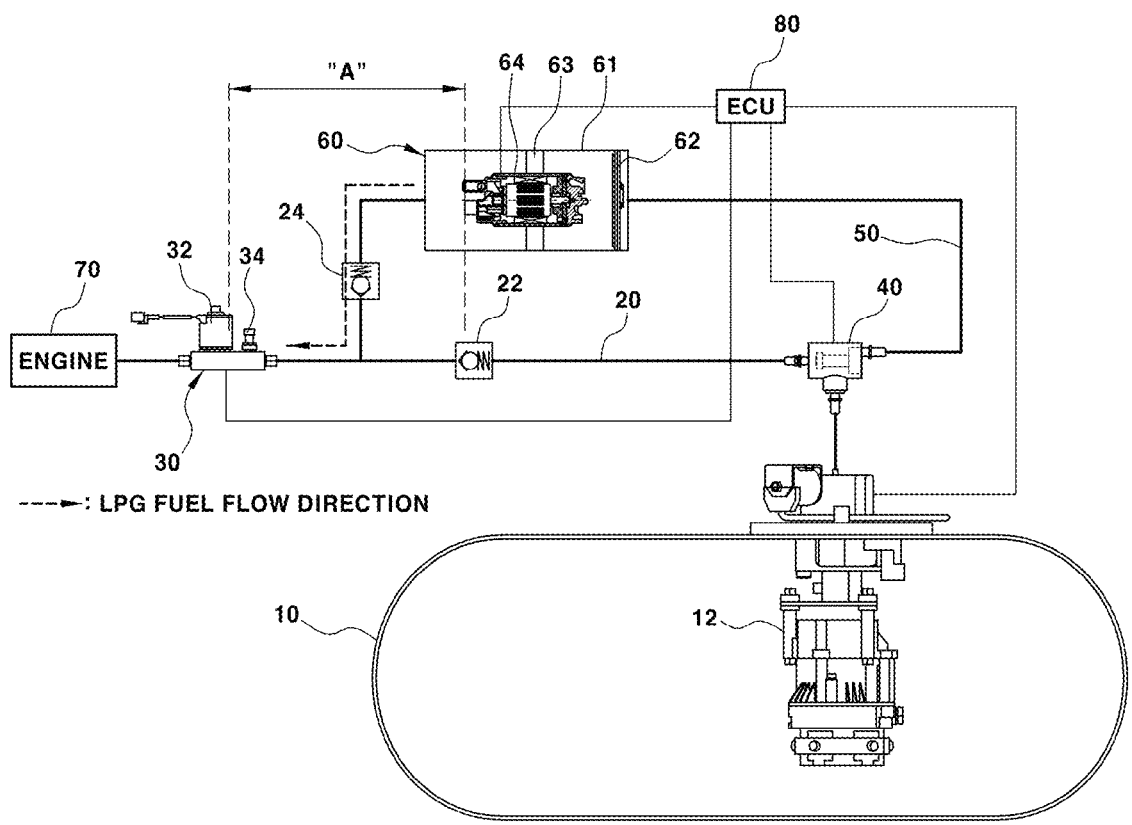

Accordingly, the motor 64-1 of the auxiliary pump 64 may be driven to rotate the impeller 64-2 to pressurize the LPG fuel toward the engine in the section indicated by "A" in FIG. 8, and the LPG fuel may be brought into contact with the rotating impeller 64-2 by the driving of the motor 64-1. Accordingly, the vapor contained in the LPG fuel may be removed, and the removed vapor may be discharged to the rear space in the auxiliary chamber 61 through the vapor discharge aperture 65 in the cover 64-3, which may prevent the generation of vapor in the fuel line.

As is apparent from the above description, according to the present disclosure, it may be possible to apply a return-less fuel system, which may supply LPG fuel from an LPG bombe to an engine at a predetermined pressure or greater and may prevent the generation of vapor in the LPG fuel, thereby eliminating a need to return a portion of the LPG fuel supplied to the engine to the LPG bombe. Further, although the related art has a problem in that the internal pressure of an LPG bombe increases above the charging pressure required for refueling due to high-temperature fuel returned to the LPG bombe, thus making it impossible for refueling of LPG fuel from a charging gun to the LPG bombe, according to the present disclosure, through the application of the returnless fuel supply system that does not return the high temperature fuel to the LPG bombe, it may be possible to eliminate the cause of the internal pressure increase in the LPG bombe, and thus to ensure efficient refueling of LPG bombe with LPG fuel.

The disclosure has been described in detail with reference to exemplary embodiments thereof. However, it will be appreciated by those skilled in the art that the present disclosure may be implemented in various modifications and alterations via, for example, addition, change or omission of constituent elements without departing from the principles and spirit of the disclosure, and these modifications and alterations are included in the scope of the present disclosure.

In addition, in the description of the exemplary embodiments of the present disclosure, a detailed description of known functions and configurations incorporated herein is omitted when it may make the subject matter of the present disclosure rather unclear. In addition, the terms used in the above description are defined in consideration of the functions in the embodiments of the present disclosure, and may be replaced by other terms based on intensions of users or operators, customs, or the like. Hence, the meanings of these terms should be based on the whole content of this specification. Accordingly, the above detailed description of the present disclosure is not intended to limit the present disclosure by the disclosed exemplary embodiments, and the accompanying claims should be construed as including other exemplary embodiments.

What is claimed is:

1. A fuel supply system for a liquefied-petroleum-gas (LPG) vehicle, comprising:
    a first fuel supply line connected to an engine and to a fuel pump mounted in an LPG bombe;
    a 3-way solenoid valve mounted on a rear end portion of the first fuel supply line;
    a regulator mounted on a front end portion of the first fuel supply line and include a solenoid valve that allows or blocks a flow of LPG fuel toward the engine and a pressure sensor configured to measure a pressure in a fuel line through which the LPG fuel flows;
    a second fuel supply line branched from the 3-way solenoid valve and connected to the first fuel supply line near a regulator inlet;
    an auxiliary pump assembly mounted on the second fuel supply line to pressurize the fuel flowing through the second fuel supply line to a reference pressure or greater and remove vapor contained in the fuel; and
    a controller configured to turn the 3-way solenoid valve on or off and operate the auxiliary pump assembly.

2. The system of claim 1, wherein the auxiliary pump assembly includes:
    an auxiliary chamber having a predetermined volume;
    a vapor removal filter mounted on an inlet side of the auxiliary chamber to primarily break the vapor contained in the LPG fuel; and
    an auxiliary pump fixedly mounted inside the auxiliary chamber via a bracket to pressurize the LPG fuel to the reference pressure or greater.

3. The system of claim 2, wherein the vapor removal filter includes:
    a filter frame; and
    a plurality of types of multilayered nonwoven fabric having different lattice structures to primarily break the vapor in the LPG fuel and attached to the filter frame.

4. The system of claim 2, wherein the auxiliary pump includes:
    a motor mounted within a case;
    an impeller configured to pressurize and pump the fuel by driving of the motor; and
    a cover mounted on a rear portion of the case to cover the impeller,
    wherein the cover is formed with a vapor discharge aperture to discharge the vapor contained in the LPG fuel to a rear space in the auxiliary chamber when the impeller rotates to pump the fuel by driving of the motor.

5. The system of claim 1, further comprising a first check valve mounted on the first fuel supply line between the regulator and the 3-way solenoid valve.

6. The system of claim 1, further comprising:
    a second check valve mounted on the second fuel supply line between the regulator and the auxiliary pump assembly.

7. The system of claim 1, wherein the controller is configured to receive a sensing signal from the pressure sensor, and when the pressure in the fuel line is the reference pressure or greater, is configured to turn off the 3-way solenoid valve to supply the LPG fuel in the LPG bombe to the engine through the first fuel supply line.

8. The system of claim 1, wherein the controller is configured to receive a sensing signal from the pressure sensor, and when the pressure in the fuel line is less than the reference pressure, is configured to turn on the 3-way solenoid valve to pressurize and supply the LPG fuel in the LPG bombe to the engine through the second fuel supply line and operate an auxiliary pump of the auxiliary pump assembly.

9. The system of claim 1, wherein the controller is configured to receive a sensing signal from an ambient temperature sensor after start-off, and when a sensed temperature is a predetermined temperature or greater, is configured to operate an auxiliary pump of the auxiliary pump assembly for a predetermined period of time.

\* \* \* \* \*